L. PATTON & H. B. WALLACE.
INSECT DESTROYER.
APPLICATION FILED APR. 13, 1917.

1,256,036.

Patented Feb. 12, 1918.
2 SHEETS—SHEET 1.

Inventor
LUTHER PATTON.
HENRY B. WALLACE.

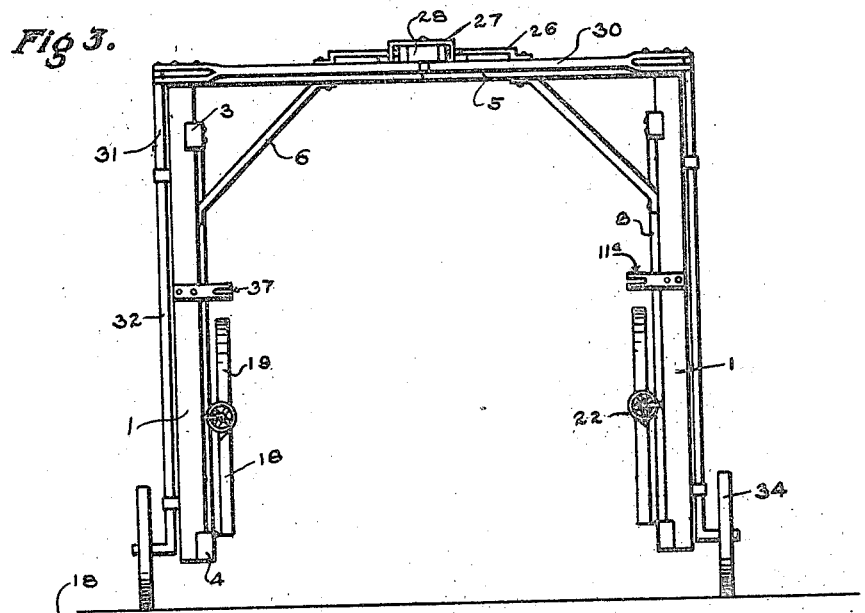
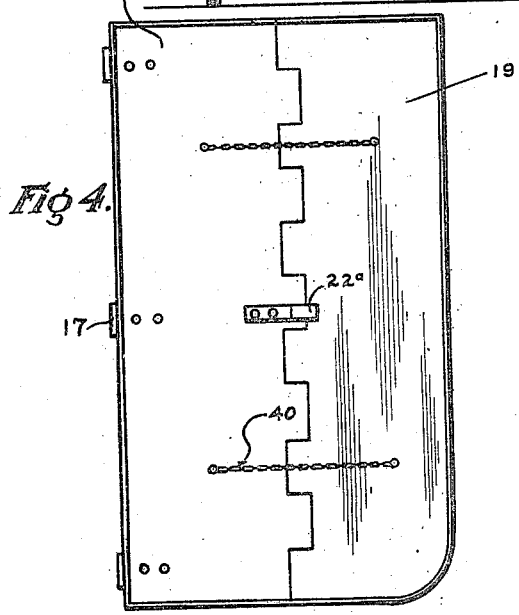
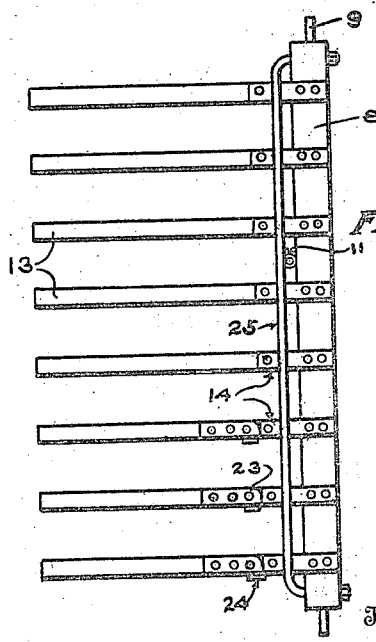
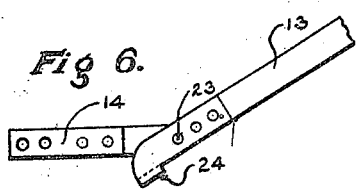

UNITED STATES PATENT OFFICE.

LUTHER PATTON AND HENRY B. WALLACE, OF BLOCTON, ALABAMA; SAID WALLACE ASSIGNOR TO SAID PATTON.

INSECT-DESTROYER.

1,256,036.

Specification of Letters Patent.

Patented Feb. 12, 1918.

Application filed April 13, 1917. Serial No. 161,830.

*To all whom it may concern:*

Be it known that we, LUTHER PATTON and HENRY B. WALLACE, citizens of the United States of America, residing at Blocton, in the county of Bibb and State of Alabama, have invented certain new and useful Improvements in Insect-Destroyers, of which the following is a specification.

This invention relates to an apparatus for dislodging, catching and destroying weevils or other insects that are injurious to vegetation, my invention being particularly adapted for use in protecting cotton plants from boll weevils, potato plants from bugs and other plants from worms or insects.

One object of this invention is to produce an apparatus that is light and comparatively inexpensive and is adapted to be drawn by horses and readily controlled but which may also be adapted to be operated by hand.

A further object of this invention is to design a novel means for engaging the plants and shaking them so as to effectually dislodge the weevils, bugs or insects therefrom and cause them to fall into trays carried by the apparatus and disposed to travel under the plants on each side of a row.

A further object of this invention is to design the plant shaking means so that it can be readily moved into or out of operating position and to adapt the lower shaker fingers to have vertical adjustment so that they can rise and fall vertically when engaged by the trays which are free to rise so they can follow the irregularities of the ground and plants.

A further object of this invention is to design the frame work with a draft appliance adapted to control the front or guiding wheels so as to make the machine directly responsive to guidance which is essential to protect the plants from injury by being struck by the trays which are formed of foldable sections so that they will yield sufficiently to protect the plant.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which:—

Fig. 3 illustrates an end view with the parts in different position of adjustment.

Fig. 4 illustrates a top plan view of the combined apron and tray.

Fig. 5 illustrates a view in elevation showing the beaters and the post from which the beaters are suspended.

Fig. 6 is a detail view of one of the hinged shaker fingers.

Fig. 7 is a detail perspective view of the pivoted finger post and the spring means for holding the same in operating position.

Fig. 8 is a sectional view taken on the line A—B of Fig. 2.

Similar reference numerals refer to similar parts throughout the drawings.

Figure 1:
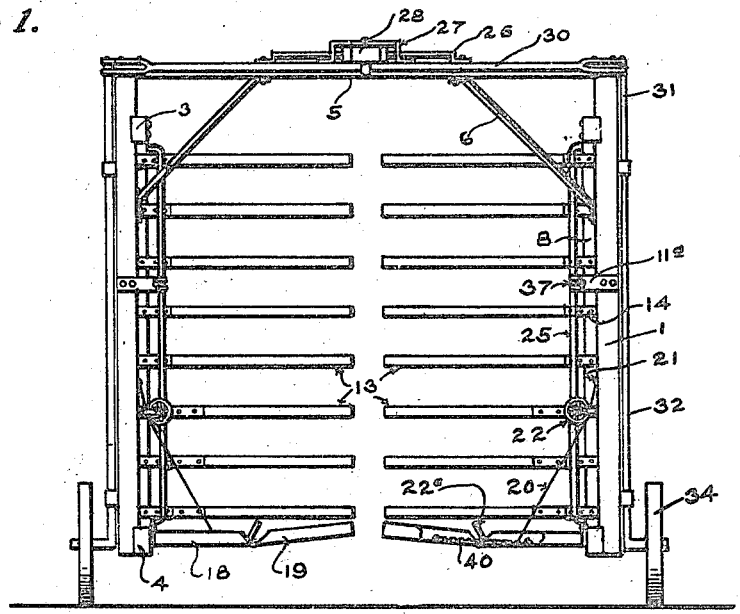
Figure 1 illustrates a view in elevation of the end of the apparatus embodying the invention.
Figure 2:
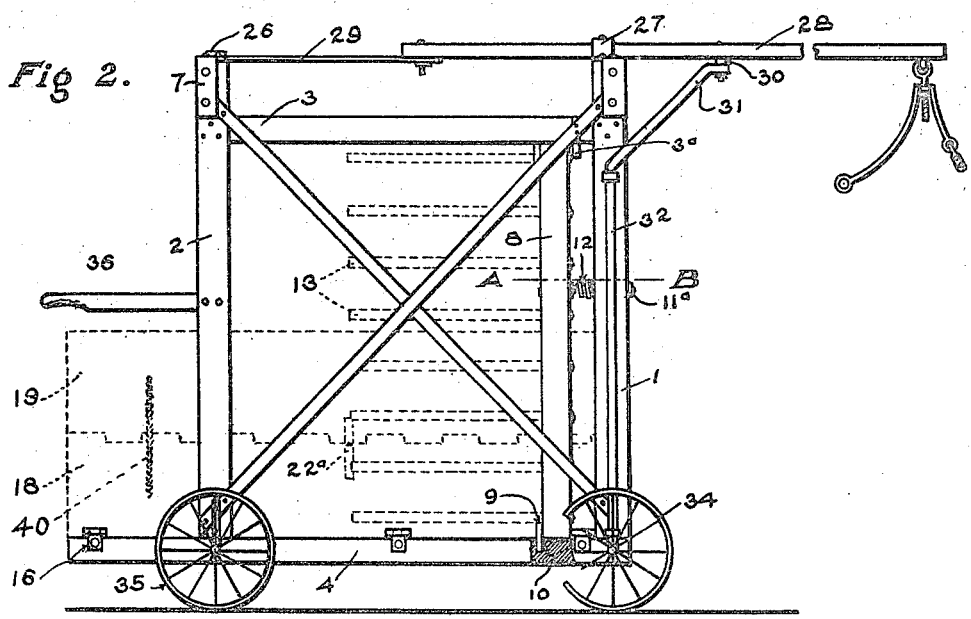
Fig. 2 illustrates a side elevation thereof.
Figure 2:
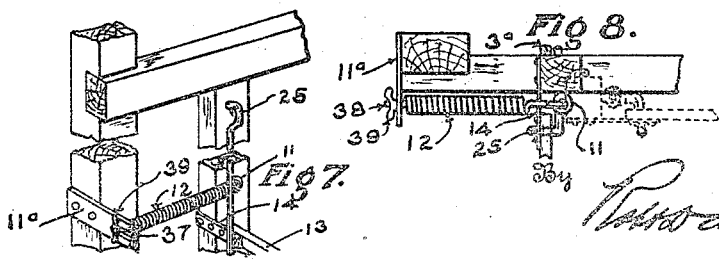

In the preferred embodiment of my invention illustrated in the drawings, I show a suitable frame-work comprising on each side a rectangular frame comprising front and rear uprights 1 and 2, respectively, connected overhead by a top bar 3 and connected at their bottom by a bar 4 which extends substantially beyond the rear upright 2. The two side frames thus formed are connected together by overhead bars 5, the front bar connecting the tops of the uprights 1 and the rear bar connecting the tops of the uprights 2. Suitable angles plates 6 and braces 7 are provided to brace the joints.

Immediately in the rear of each upright 1 is a post 8 provided with pivots 9 which turn in sockets 10 in the upper and lower bars 3 and 4 of each frame. Each post carries a screw eye 11 to which is connected a coil spring 12 adapted at its other end to be detachably connected to a bracket 11ᵃ on the adjacent front upright 1. Each post 8 forms a support for a plurality of beaters or shaker fingers 13, each of which is connected and supported by a flat spring plate 14 disposed in a vertical plane and attached at one end to a side face of its respective post 8 by means of screws, bolts or the like. The shaker fingers are arranged in a vertical row on each side of the frame at the front end thereof. They are disposed in approximately horizontal position but are yieldable, so that when they come in contact with the stalk or branches of a plant, the springs bend and as the shaker fingers are drawn through the branches they snap forward striking other branches and thus shaking the plants so as to effectively dislodge the insects, worms or eggs without, however, damaging the plants.

While we have referred to insects and worms heretofore in this specification, it is to be understood that this apparatus is intended to be used for the dislodgment and collection of weevil flies, sharp shooters, boll weevils, punctured squares, worms and the like and in using the comprehensive term, it is to be understood that we include therein all vegetation destroyers which occupy or inhabit the plants or branches above the ground.

The posts 8 are capable, when springs 12 are disengaged from the brackets 11ᵃ of being turned on their pivots 9 so that they lie parallel with the sides of the frame and when yieldingly held by the action of spring 12 on the posts 8 at right angles to the sides of the frame the freedom of the posts to turn and yield when the fingers strike an obstruction makes provision for permitting the apparatus to pass over stumps, rocks or obstructions which might interfere with or injure the shaker fingers should they come in contact with such fixed objects. To facilitate the ready attachment of the springs 12 to the brackets 11ᵃ or their detachment therefrom, each bracket has an open ended slot 37 in its outer end and each spring carries a screw 38 at its free end adapted to enter the slot and be held in place and adjusted by a thumb nut 39.

As a means for arresting or collecting the insects, each side of the frame has brackets 16 to which we hinge brackets 17 that carry trays 18, and the outer edges of the trays in turn have aprons 19 hinged to them so that the said aprons are free to swing upwardly at an angle with relation to the trays, and the tray and apron may be swung to an approximately vertical position to permit a clearance between the sides of the frame when obstructions are encountered.

The trays are supported at different positions of adjustment by chains 20 and the links of the chain may be utilized to effect this adjustment by reason of the fact that the links thereof may be moved with relation to the hooks or staples 21 projecting from the upper surface of each upright 1. The chains pass around guide pulleys 22 journaled on each upright 1.

We have found in practice that when the upper surfaces of the trays and aprons are coated with tar, it constitutes an effective tanglefoot which will prevent the escape of insects and furthermore that when the deposit of the tar has reached a predetermined stage, the tar may be removed from the aprons and trays and ignited, thus causing the consumption and destruction of the insects and the eggs.

A bent bar 22ᵃ is attached to the upper face of each tray in position to engage the apron at the end thereof and prevent it swinging upwardly beyond a certain point and chains 40 are fastened to both tray and apron so as to hold the aprons at a rising inclination so that when they come in contact with plants in the line of the drill or out of same the aprons will yield upwardly without doing harm to the plants thus engaged. The lower shaker fingers are each provided with a hinge joint 23 which only permits them to rise or move upward or downward so as to allow the aprons and trays to adjust themselves to the plants and other obstacles while the apparatus is in operation. Each hinge comprises a stop lug 24 which prevents the finger swinging below a horizontal position but leaves it free to swing upwardly.

In order to prevent the fingers from swinging too far to the front and thus having a chance to flail the plants, thereby inflicting damage on the branches of the same, we mount on each finger post 8 a stop rod 25 having its upper ends made fast to the post and its body portion bent forward and passed downwardly in a vertical line in front of the springs 14 so as to stop the forward swing of the latter beyond a plane at right angles to the line of draft. Each top bar 3 carries a depending stop 3ᵃ which will engage a side of the adjacent post 8 and positively arrest it in position with its shaker fingers at right angles to the frame sides. These rods and the springs 12 and the stops 3ᵃ hold the fingers in proper position to engage the plants.

The pivots 9 are preferably formed by plates 9ᵃ attached at the center of the rear face of the posts 8 when in operating position.

A guide plate 26 is mounted on the rear cross bar 5 and a bracket 27 is mounted centrally on top of the forward cross bar 5. A tongue 28 is pivoted between the bracket 27 and the forward cross bar and has pivotally connected to its rear end a metal bar 29 which works back and forth under the guide 26 and holds down the rear end of the tongue. In front of its point of connection to the frame the tongue carries a pivoted cross bar 30 having its outer ends bifurcated and each pivotally connected to a crank 31 provided at the upper end of a rod 32, one of which is mounted to turn in suitable bearings 33 on the outside of each forward upright 1. These rods 32 at their lower ends are out-turned and form journal bearings for the forward steering wheels 34. The rear wheels 35 are mounted on rigid brackets at the rear of the frame. The relation of parts is such that the lateral movements of the tongue will rock the bar 30 so as to steer the forward wheels 34 and guide the apparatus with ease and convenience. If desired a handle 36 may be attached to the rear of the frame so that the machine can be lifted by hand and turned directly around and placed on or over the next row of plants to be treated.

In operation, having adjusted the trays to the proper height the apparatus is moved along a row of plants with the stalks passing between the aprons 19 and the shaker fingers engaging and agitating the plants. The springs 12 and 14 both afford great flexibility to the fingers and cause them to effectually dislodge the insects without injuring the plants. As the aprons and trays rise and fall responsive to irregularities in the ground, the lower fingers will give way before them, due to the action of the hinge 23.

The further operation and advantages of our invention will be understood and appreciated by those skilled in the art and our invention may be obviously modified in its details of construction without departing from the spirit of our invention.

Having thus described our invention, what we claim as new and desire to secure by Letters Patent, is:—

1. In an insect catcher, a frame adapted to be moved with relation to plants, posts rotatably mounted in the frame, springs secured to the posts and extending approximately at right angles thereto, shaker fingers carried by the said springs, means for holding the posts with the shaker fingers in position to engage the plants, and means for removing insects dislodged by the shaker fingers.

2. In an insect catcher, a frame adapted to be moved with relation to plants, posts rotatably mounted in the frame, springs secured to the posts and extending approximately at right angles thereto, shaker fingers carried by the said springs, means for holding the posts with the shaker fingers in operating position, means for removing insects dislodged by the shaker fingers, said means consisting of trays, means for pivotally connecting the trays to the frame, and aprons adjustably connected to the said trays.

3. In an insect catcher, a frame adapted to be moved with relation to plants, posts rotatably mounted in the frame, springs secured to the posts and extending approximately at right angles thereto, shaker fingers carried by the said springs, yielding means for holding the posts with the shaker fingers in position to engage the plants, means for removing insects dislodged by the shaker fingers, said means consisting of trays, means for pivotally connecting the trays to the frame, aprons pivotally connected to the trays, and means for adjusting the aprons with relation to the trays.

4. In an insect catcher, a frame adapted to be moved with relation to plants, posts rotatably mounted in the frame and substantially vertically disposed, springs secured to the posts and extending approximately at right angles thereto, shaker fingers carried by the said springs, yielding means for holding the posts in predetermined operating position, means for removing insects dislodged by the shaker fingers, said means consisting of trays, means for pivotally connecting the trays to each side of the frame, aprons pivotally connected to the adjacent edges of the trays and adapted to yield upwardly, and means for holding the trays in the desired position of adjustment about their pivotal centers.

5. In an insect catcher, a frame adapted to travel over a row of plants, a post rotatably mounted in the frame, flat springs projecting laterally from the post, shaker fingers connected to the springs, spring means to yieldingly hold the post with the fingers substantially at right angles to the row of plants, and stop means on the frame to limit the forward movements of the posts responsive to said springs means.

6. In an insect destroyer, a frame comprising an upright member, shaker fingers carried by said member and normally disposed to engage the plants, a tray hingedly connected to the frame below the fingers and adapted to fold upwardly, one or more of the lower fingers having joints therein to permit them to swing upwardly, and stop means to limit the downward swing of the fingers about said joints.

7. In an insect destroyer, a frame-work comprising on each side a rigid upright member, a second upright member adjacent to the rigid member and pivotally mounted, flat springs attached to each pivoted member, shaker fingers carried by the springs, stop means carried by each rigid upright member which are adapted to engage and stop the forward movements of the shaker fingers beyond the position at a predetermined angle to the row of plants operated on, and a spring connection between each rigid and the adjacent pivoted post to yieldingly hold the latter in position with its fingers against said stops, substantially as described.

8. In an insect catcher, a wheel supporting frame, finger supports movable about substantially vertical axes in the frame, spring means to press said supports toward their operating position, shaker fingers, springs connecting said shaker fingers to said supports, and stop means on the frame adapted to engage the free ends of said springs to prevent the fingers swinging horizontally beyond a predetermined angle to the path of travel of the frame.

9. In an insect catcher, a portable frame, plant engaging means carried by the frame for dislodging insects, means for catching the dislodged insects consisting of trays pivotally connected at their outer sides to the frame and disposed on each side of the plants under treatment, each tray having a hinged upwardly folding extension at its free edge, and means to limit the movement of said extensions about their hinged connections to the tray, substantially as described.

In testimony whereof we affix our signatures.

LUTHER PATTON.
HENRY B. WALLACE.

Witness:
NOMIE WELSH.

Copies of this patent may be obtained for five cents each, by addressing the "Commissioner of Patents, Washington, D. C."